United States Patent
Yoshimoto et al.

(10) Patent No.: US 10,047,803 B2
(45) Date of Patent: Aug. 14, 2018

(54) POWER TRANSMITTING APPARATUS

(71) Applicant: KABUSHIKI KAISHA F.C.C., Hamamatsu-shi, Shizuoka (JP)

(72) Inventors: Katsu Yoshimoto, Hamamatsu (JP); Han Hiong Chen, Hamamatsu (JP); Kaoru Aono, Hamamatsu (JP); Masataka Murai, Hamamatsu (JP)

(73) Assignee: KABUSHIKI KAISHA F.C.C., Hamamatsu-Shi (JP)

( * ) Notice: Subject to any disclaimer, the term of this patent is extended or adjusted under 35 U.S.C. 154(b) by 596 days.

(21) Appl. No.: 14/560,281

(22) Filed: Dec. 4, 2014

(65) Prior Publication Data
US 2015/0337910 A1     Nov. 26, 2015

Related U.S. Application Data

(63) Continuation of application No. PCT/JP2013/065359, filed on Jun. 3, 2013.

(30) Foreign Application Priority Data

Jun. 4, 2012   (JP) ................................ 2012-127440

(51) Int. Cl.
  *F16D 13/56*    (2006.01)
  *F16D 43/12*    (2006.01)
(52) U.S. Cl.
  CPC ............. *F16D 13/56* (2013.01); *F16D 43/12* (2013.01); *F16D 2013/565* (2013.01)
(58) Field of Classification Search
  CPC .......... F16D 13/56; F16D 43/08; F16D 43/12; F16D 2013/565; F16D 13/71
  See application file for complete search history.

(56) References Cited

U.S. PATENT DOCUMENTS 4,645,049 A * 2/1987 Matsuda ................. F16D 13/04
                                                192/105 B
7,191,882 B2 * 3/2007 Kataoka ................. F16D 13/04
                                                192/54.5
(Continued)

FOREIGN PATENT DOCUMENTS

JP    H04-357339     12/1992
JP    8-93786 A      4/1996
(Continued)

OTHER PUBLICATIONS

International Search Report for Application No. PCT/JP2013/065359 dated Aug. 6, 2013, in 2 pages.

*Primary Examiner* — Terry C Chau
(74) *Attorney, Agent, or Firm* — Knobbe, Martens, Olson & Bear, LLP

(57) ABSTRACT

A power transmitting apparatus for transmitting or cutting-off the rotational driving power inputted to an input member to or from an output member by press-contacting or releasing the press-contacting force between driving-side clutch discs and driven-side clutch discs, wherein the power transmitting apparatus comprises interlocking members (e.g., a first member and second member) interlocking with the motion of the weight members from their radially inward positions to radially outward positions and movable toward a direction approaching to the pressure member; and elastic members interposed between the interlocking members and the pressure member and able to move the pressure member toward a direction for press-contacting the driving-side clutch discs and the driven-side clutch discs by urging the pressure member according to the movement of the interlocking members and also able to absorb the urging force of the pressure member applied to interlocking members when the actuating member is operated.

15 Claims, 14 Drawing Sheets

(56) References Cited

U.S. PATENT DOCUMENTS

| | | | | |
|---|---|---|---|---|
| 2009/0000898 A1* | 1/2009 | Inomori | ............... | F16D 43/12 |
| | | | | 192/70.11 |
| 2009/0107794 A1* | 4/2009 | Einboeck | ............... | F16D 13/56 |
| | | | | 192/70.28 |
| 2012/0024651 A1* | 2/2012 | Miyazaki | ............... | F16D 43/10 |
| | | | | 192/66.32 |

FOREIGN PATENT DOCUMENTS

| JP | 2005-325993 A | 11/2005 |
|---|---|---|
| JP | 2010-60106 A | 3/2010 |

\* cited by examiner

POWER TRANSMITTING APPARATUS

INCORPORATION BY REFERENCE TO ANY PRIORITY APPLICATIONS

Any and all applications for which a foreign or domestic priority claim is identified in the Application Data Sheet as filed with the present application, or any corrections thereto, are hereby incorporated by reference under 37 CFR 1.57.

BACKGROUND OF THE INVENTIONS

Field of the Inventions

The present inventions relate to a power transmitting apparatuses for arbitrarily transmitting or cutting-off the rotational driving power of an input member to or from an output member.

Description of the Related Art

In general, the power transmission apparatus for a motorcycle is intended to arbitrarily perform transmission of or cutting-off of the driving power of an engine to or from a transmission and a driving wheel and comprises an input member connected to an engine-side, an output member connected to a transmission and a driving wheel-side, a clutch member connected to the output member, and a pressure member able to approach or separate from the clutch member. The driving power can be transmitted by approaching and press-contacting a plurality of driving-side clutch discs and driven-side clutch discs to each other or cut off by separating them from each other and releasing the press-contacting force acting on them.

As disclosed in JP 2010-60106 A, a power transmitting apparatus of the prior art has been proposed which comprises weight members arranged in radially extending grooves formed on a clutch housing. The power transmitting apparatus press-contacts driving-side clutch discs and driven-side clutch discs due to movement of the weight members from their radially inward positions to radially outward positions caused by a centrifugal force due to rotation of the clutch housing. The power transmitting apparatus includes an actuating member operated by a manually operating means for releasing the press-contacting force between the driving-side clutch discs and the driven-side clutch discs.

More particularly, the power transmitting apparatus of the prior art comprises a first pressure plate actuated by the actuating member and a second pressure plate actuated by movement of the weight members, and the driving-side clutch discs and the driven-side clutch discs are arranged between the first and second pressure plates. In addition, the cutting-off of power transmission due to manual operation of the actuating member is performed by releasing the press-contacting force between the driving-side clutch discs and driven-side clutch discs by moving the first and second pressure plates, and the power due to movement of the weight members is performed by press-contacting the driving-side clutch discs and the driven-side clutch discs by moving the second pressure plate.

According to the power transmitting apparatus of the prior art, it is possible to apply the centrifugal force to the weight members due to rotation of the clutch housing caused by engine rotation, to press-contact the driving-side clutch discs and the driven-side clutch discs by actuating the first pressure plate, and to release the press-contacting force between the driving-side clutch discs and the driven-side clutch discs by actuating the second pressure plate while keeping position of the weight members (radially outward position) during cutting-off of the power transmission by operating the actuating member by manual operation. Accordingly it is possible to improve the operability of the power transmitting apparatus during cutting-off operation of the power transmission.

SUMMARY OF THE INVENTIONS

However, according to the power transmitting apparatus of the prior art, although it is possible to improve the operability of the power transmitting apparatus during cutting-off operation of the power transmission thanks to the fact that the position of the weight members (radially outward position) can be kept during cutting-off of the power transmission, since it requires two pressure plates such as the first and second pressure plates as movable members, there exists the problems that the structure of the power transmitting apparatus is complicated and malfunction of the apparatus would be increased. There is concern that these problems would be caused when the cutting-off of power transmission is performed by a powered actuator such as an electric motor.

It is, therefore, an object of the present inventions to provide a power transmitting apparatus which can maintain the operability of the power transmitting apparatus during the cutting-off operation of power transmission and to simplify the structure of the power transmitting apparatus to reduce the risk of malfunction in the operation of the power transmitting apparatus.

In some embodiments, there is provided a power transmitting apparatus for transmitting or cutting-off the rotational driving power inputted to an input member to or from an output member by press-contacting or releasing the press-contacting force between driving-side clutch discs and driven-side clutch discs. The power transmitting device can comprise a clutch housing rotatable together with the input member and mounted thereon a plurality of the driving-side clutch discs; a plurality of the driven-side clutch discs arranged between the driving-side clutch discs of the clutch housing alternately therewith; a clutch member connected to the output member; a pressure member mounted on the clutch member and axially movably relative to the clutch member so that the driving-side clutch discs and the driven-side clutch discs are forced to be press-contacted each other and the press-contacting force acting on them are released in accordance with axial approach and separation of the pressure member relative to the clutch member; weight members arranged in radially extending grooves formed on the clutch housing for press-contacting the driving-side clutch discs and the driven-side clutch discs according to movement of the weight members from their radially inward positions to radially outward positions caused by a centrifugal force due to rotation of the clutch housing; and an actuating member for moving the pressure member toward a direction for releasing the press-contacting force between the driving-side clutch discs and driven-side clutch discs. In some embodiments, the power transmitting apparatus further comprises interlocking members (e.g., first member and second members) interlocking with the motion of the weight members from their radially inward positions to radially outward positions and movable toward a direction approaching to the pressure member; and elastic members interposed between the interlocking members and the pressure member and able to move the pressure member toward a direction for press-contacting the driving-side clutch discs and the driven-side clutch discs by urging the pressure member according to the movement of the interlocking members and also able to absorb the urging force of the pressure member applied to interlocking members when the actuating member is operated.

In some embodiments, the elastic members comprises springs interposed between the interlocking members and the pressure member.

In some embodiments, the interlocking members comprise a first sheet member connected to the clutch housing and a second sheet member holding the elastic members. A friction member "m" can be interposed between abutting surfaces of the first sheet member and the second sheet member.

In some embodiments, the power transmitting apparatus further comprises a holding device (e.g., urging device and stopper; abutting surface) for keeping a separated distance between the actuating member and the operating device and for allowing the motion of the actuating member.

In some embodiments, the power transmitting apparatus further comprises press-contact assisting cams formed by inclined cam surfaces formed on the clutch member and inclined cam surfaces formed on the pressure member which are arranged opposite from each other and adapted to increase the press-contacting force between the driving-side clutch discs and the driven-side clutch discs when the rotational driving power inputted to the input member can be transmitted to the output member.

According to some variants, the actuating member can be operated by the operating device driven by manual or power.

In some embodiments, since the power transmitting apparatus comprises interlocking members (e.g., first member and second member) interlocking with the motion of the weight members from their radially inward positions to radially outward positions and movable toward a direction approaching to the pressure member; and elastic members interposed between the interlocking members and the pressure member and able to move the pressure member toward a direction for press-contacting the driving-side clutch discs and the driven-side clutch discs by urging the pressure member according to the movement of the interlocking members and also able to absorb the urging force of the pressure member applied to interlocking members when the actuating member is operated, it is possible to maintain the operability of the power transmitting apparatus during the manual cutting-off operation of power transmission, to simplify the structure of the power transmitting apparatus, and thus to reduce the risk of operational malfunction of the power transmitting apparatus.

In some embodiments, since the elastic members comprise springs interposed between the interlocking members and the pressure member, it is possible to surely and smoothly absorb the urging force of the pressure member applied to the interlocking members during operation of the actuating member.

In some embodiments, since the interlocking members comprises a first sheet member connected to the clutch housing and a second sheet member holding the elastic members, and a friction member is interposed between abutting surfaces of the first sheet member and the second sheet member, it is possible to smoothly perform sliding motion between the first and second sheet members during rotation of the first sheet member relative to the second sheet member and surely perform the integral rotation and movement of the first and second sheet members.

According to the present inventions of claim 4, since the power transmitting apparatus further comprises a holding device (urging device and stopper; abutting surface) for keeping a separated distance between the actuating member and the operating device and allowing the motion of the actuating member, it is possible to prevent the starting point of actuation of the actuating member from being differentiated by positions of the pressure member and thus to improve the operability of the clutch operation.

According to the present inventions of claim 5, since the power transmitting apparatus further comprises press-contact assisting cams formed by inclined cam surfaces formed on the clutch member and inclined cam surfaces formed on the pressure member which are arranged opposite each other and adapted to increase the press-contacting force between the driving-side clutch discs and the driven-side clutch discs when the rotational driving power inputted to the input member can be transmitted to the output member, it is possible to apply the press-contacting force to the driving-side clutch discs and the driven-side clutch discs in addition to the press-contacting force caused by movement of the weight members due to the centrifugal force and thus to achieve more smooth and sure press-contact of the driving-side clutch discs and the driven-side clutch discs.

BRIEF DESCRIPTION OF THE DRAWINGS

FIGS. 10A and 10B illustrate perspective views showing a second sheet member (e.g., the other of interlocking members) of the power transmitting apparatus in which FIG. 10A shows a front surface of the second sheet member and FIG. 10B shows a back surface thereof;

DETAILED DESCRIPTION OF THE PREFERRED EMBODIMENTS

Preferable embodiments of the present inventions will be hereinafter described with reference to the accompanying drawings.

Figure 1:
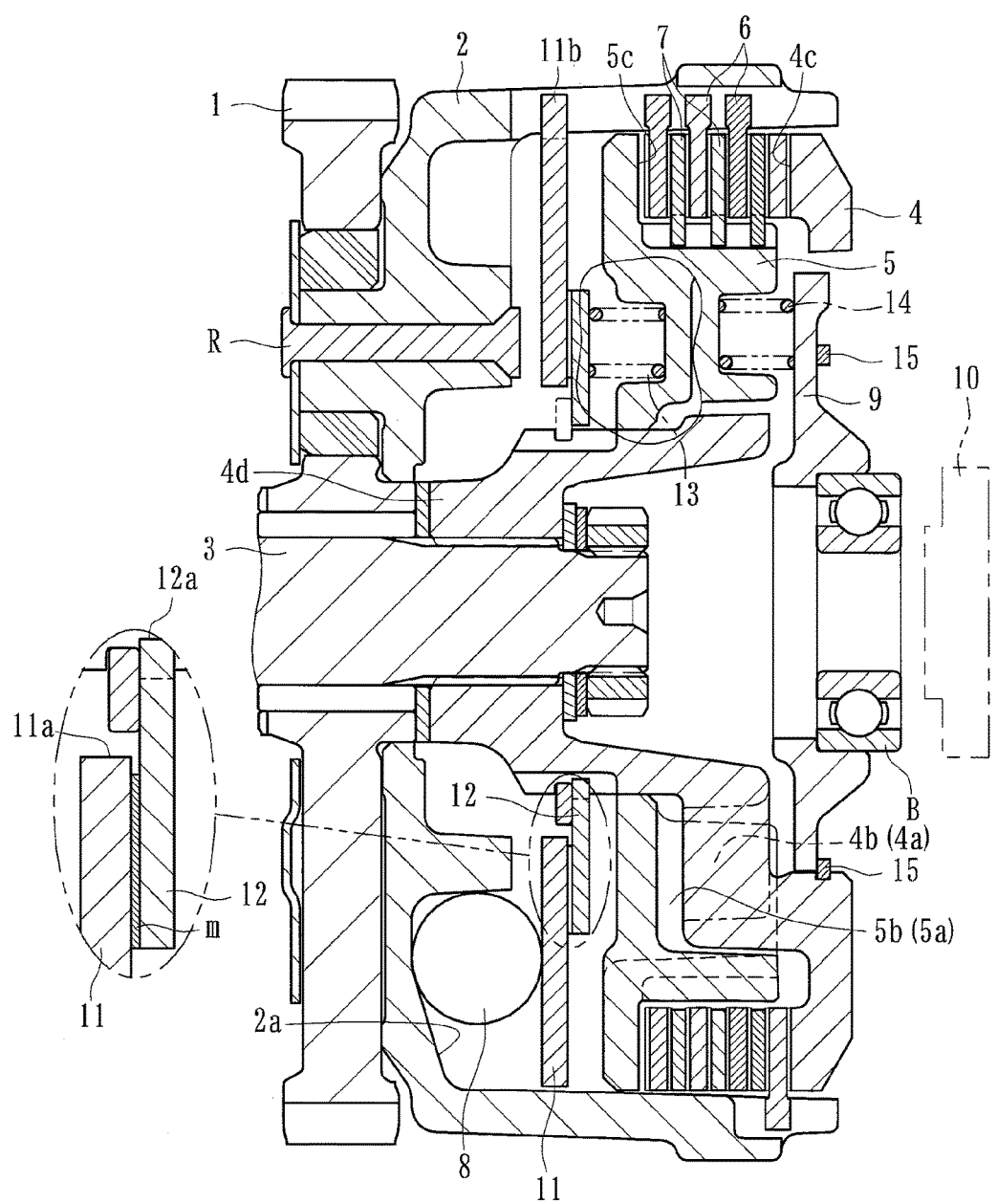
FIG. 1 illustrates a longitudinal section view of a power transmitting apparatus of a first embodiment of the present inventions.
Figure 2:
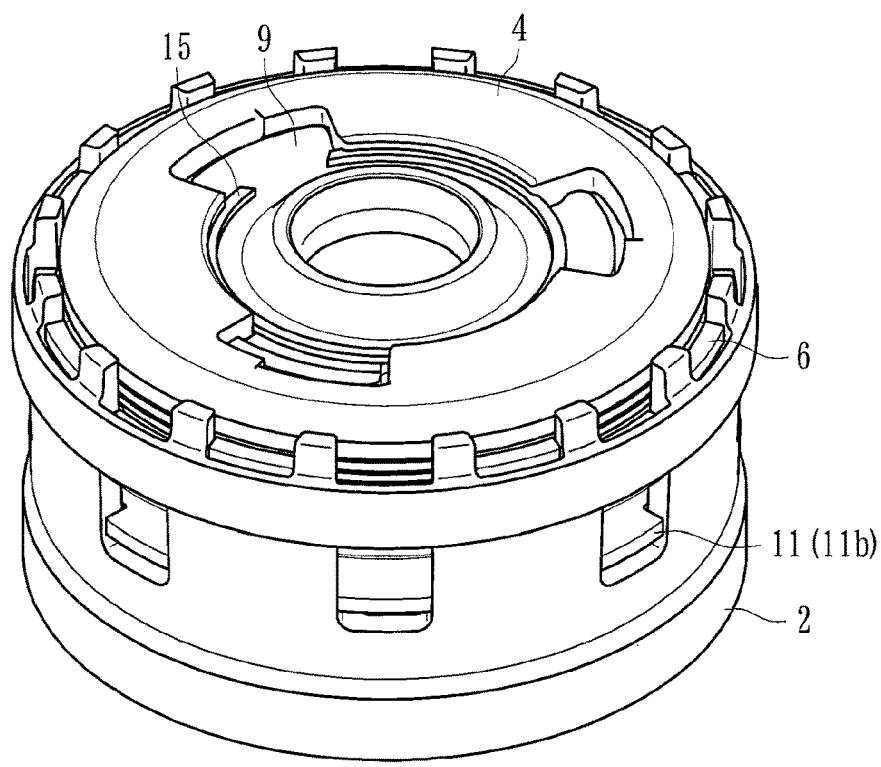
FIG. 2 illustrates a perspective view showing a main structural parts of the power transmitting apparatus of FIG. 1.

A power transmitting apparatus of a first embodiment of the present inventions can be mounted on a vehicle such as a motorcycle to arbitrarily transmit or cut-off the driving power of an engine to or from a transmission or driving wheel. As shown in FIGS. 1 and 2, the power transmitting apparatus mainly comprises a clutch housing 2 on which a gear 1 as an input member is mounted, a clutch member 4 connected to a shaft 3 as an output member, a pressure member 5 arranged at the left (e.g., in the frame of reference of FIG. 1) of the clutch member 4, a plurality of driving-side clutch discs 6 and a plurality of driven-side clutch discs 7, weight members 8 formed of hard balls rollable within the clutch housing 2 (e.g., one weight member 8 is shown in FIG. 1), a manually operable actuating member 9, a first sheet member 11 and a second sheet member 12 acting as interlocking members, and/or elastic members 13.

The gear 1 can be connected to the clutch housing 2 via rivets "R" or other fasteners/connectors and can be rotated around the shaft 3 by the driving power (e.g., rotational power) transmitted from the engine. The clutch housing 2 can be formed as a cylindrical casing opened at its right end (e.g., in the frame of reference of FIG. 1) and rotates with the rotation of the gear 1. A plurality of driving-side clutch discs 6 are axially slidably mounted on the inner circumference of the clutch housing 2. Each of the driving-side clutch discs 6 comprises a substantially annular plate and is adapted to be rotated together with the clutch housing 2 and axially slidable to both the left and right (e.g., in the frame of reference of FIG. 1) therealong.

Figure 3:
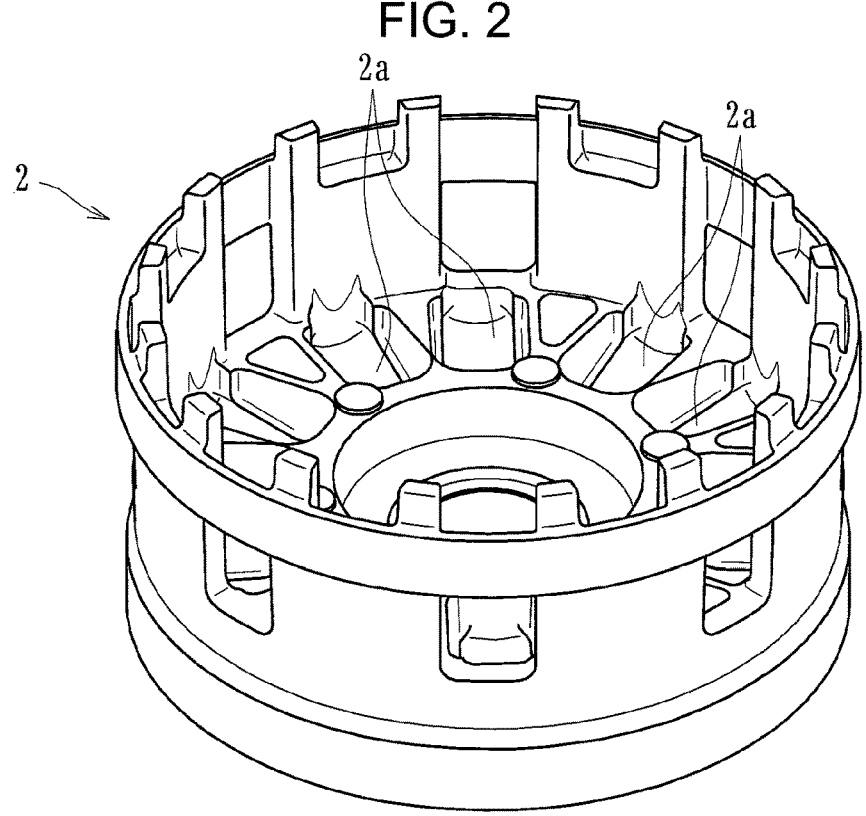
FIG. 3 illustrates a perspective view showing a clutch housing of the power transmitting apparatus of FIG. 1.

The clutch housing 2 can be formed, on its bottom surface, with a plurality of radially extending grooves 2a as shown in FIG. 3. One weight member 8 can be arranged in each groove 2a and the weight members 8 can be positioned at radially innermost positions shown in FIG. 1 when the clutch housing 2 is in a stopped condition and positioned at radially outermost positions shown in FIG. 12 when the clutch housing 2 is in a rotating condition.

The clutch member 4 can be secured at its base 4d to a tip end of the shaft (e.g., output member) 3 which is rotated together with the clutch member 4 when it is rotated. The pressure member 5 can be axially slidably mounted on the clutch member 4 and a plurality of driven-side clutch discs 7 can be axially slidably mounted on the pressure member 5. The driving-side clutch discs 6 and the driven-side clutch discs 7 are arranged alternately each other (e.g., interleaved) between a flange surface 5c of the pressure member 5 and a flange surface 4c of the clutch member 4.

Figure 4:
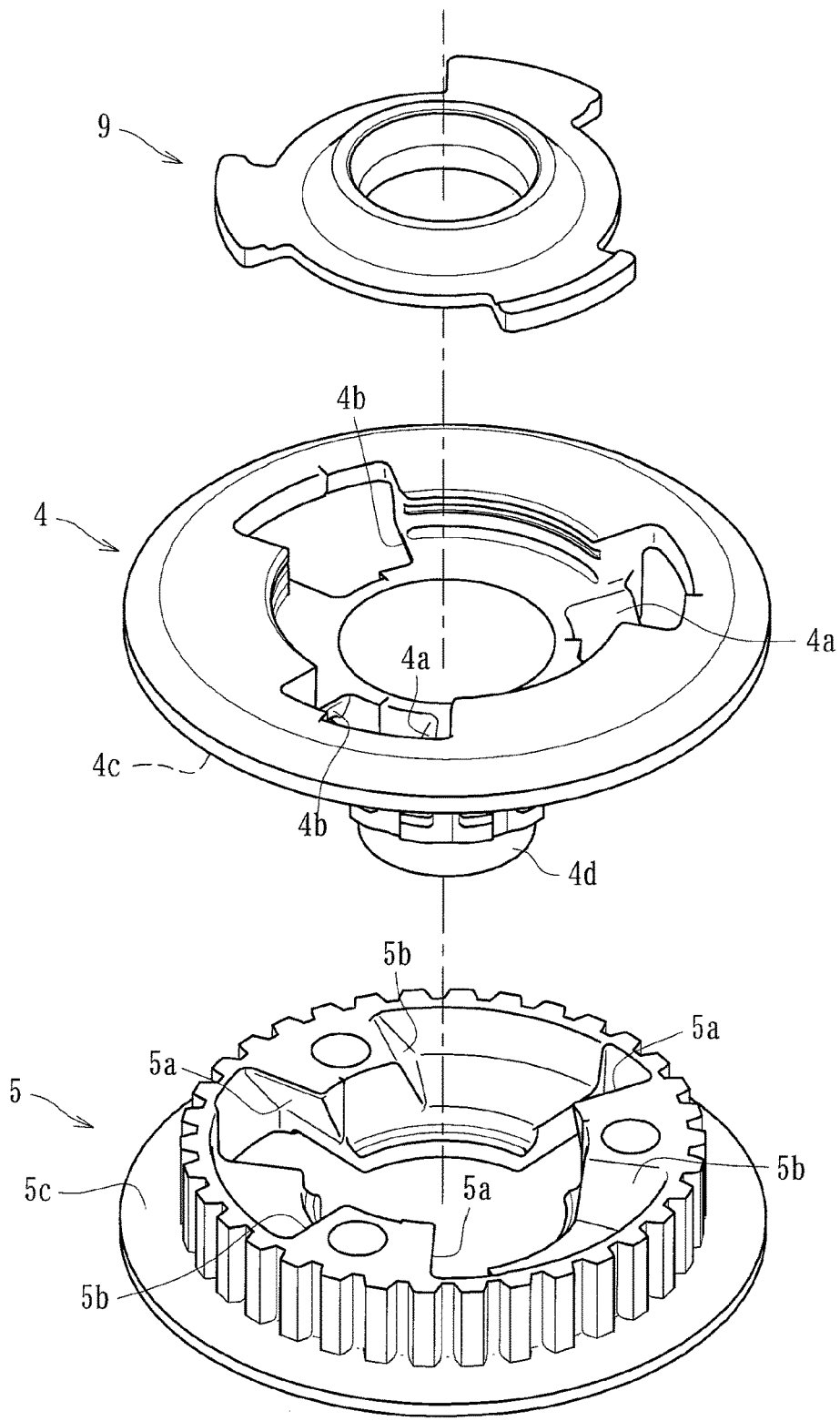
FIG. 4 illustrates a perspective view showing a clutch member, pressure member and an actuating member of the power transmitting apparatus of FIG. 1.
Figure 5:
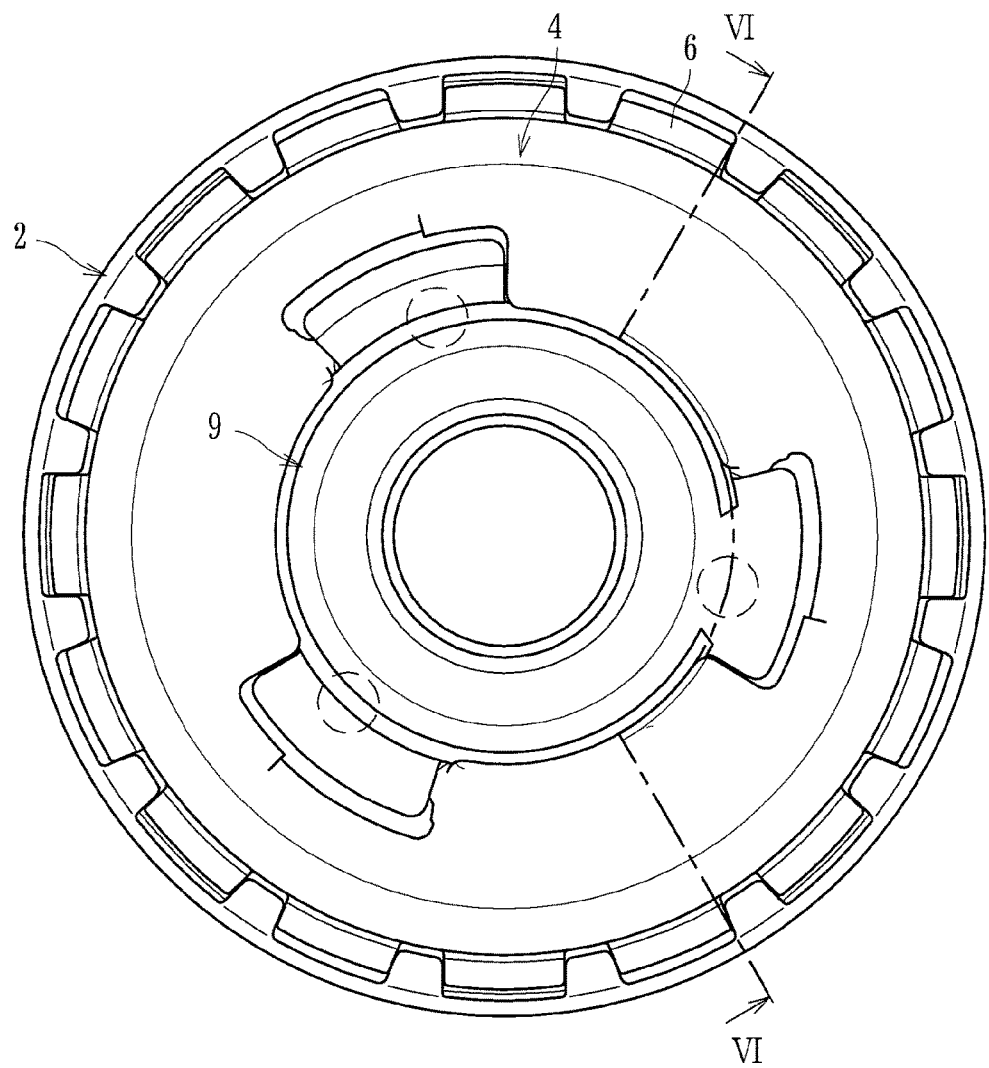
FIG. 5 illustrates a plan view of the power transmitting apparatus of FIG. 1.

The pressure member 5 can be axially movably mounted on the clutch member 4 as described above and can press-contact the driving-side clutch discs 6 and the driven-side clutch discs 7 and release the press-contacting force between the driving-side clutch discs 6 and the driven-side clutch discs 7 according to axial movement of the pressure member 5 relative to the clutch member 4. As shown in FIG. 4, the pressure member 5 can be formed with spline extending along its axis on which the driven-side clutch discs 7 are slidably fitted.

More particularly, the spline can be formed on substantially the whole outer circumference of the pressure member 5 as shown in FIG. 4 and the driven-side clutch discs 7 can be fitted in the spline so that they can axially slide relative to the pressure member 5 and rotate together with the pressure member 5.

The driving-side clutch discs 6 and the driven-side clutch discs 7 are alternately arranged (e.g., interleaved) to form a lamination so that they can be press-contacted with and released from each other. That is, both the clutch discs 6, 7 can axially slide respectively on the clutch housing 2 and the pressure member 5. Accordingly, both the clutch discs 6, 7 can be press-contacted when the pressure member 5 is moved toward the right (e.g., in the frame of reference of FIG. 1) so that the flange surface 5c of the pressure member 5 approaches the flange surface 4c of the clutch member 4. Thus the rotational power of the clutch housing 2 can be transmitted to the clutch member 4 and shaft 3 via the pressure member 5. On the contrary, when the pressure member 5 is moved toward the left (e.g., in the frame of reference of FIG. 1) so that the flange surface 5c of the pressure member 5 and the flange surface 4c of the clutch member 4 are moved away from each other, the press-contacting force between the clutch discs 6, 7 is released. Accordingly, the clutch member 4 is not rotationally coupled with the clutch housing 2 and thus the rotational power also cannot be transmitted to the shaft 3.

In this specification, the term "separation" of the clutch discs 6, 7 does not necessarily mean a condition where any clearance is caused between the clutch discs 6, 7. Accordingly, it includes a condition in which the clutch member 4 cannot follow the rotation of the clutch housing 2 (e.g., due to slippage between the clutch discs 6, 7). Accordingly, the apparatus is configured to transmit the rotational power (e.g., the driving power of an engine) inputted to the clutch housing 2 to the shaft 3 (e.g., the output member) when the driving-side clutch discs 6 and the driven-side clutch discs 7 are press contacted to each other while preventing the transmission of the rotational power (e.g., the driving power of the engine) inputted to the clutch housing to the shaft 3 (e.g., output member) in the condition where the driving clutch discs 6 and the driven-side clutch discs 7 are released from one another.

Figure 6:
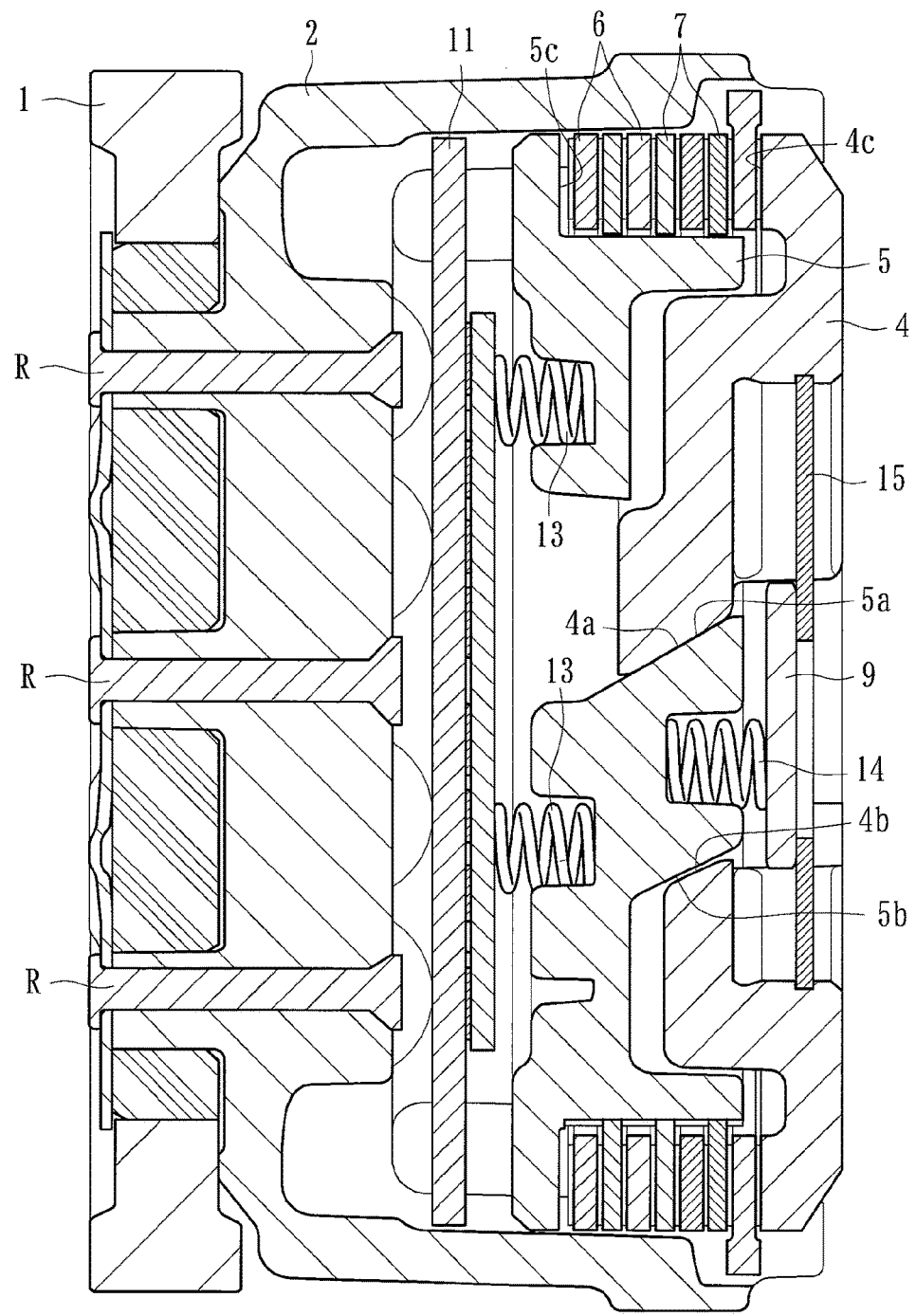
FIG. 6 illustrates a longitudinal section view taken along a line VI-VI of FIG. 5 showing a press-contact assisting cam and a back-torque limiting cam.
Figure 7:
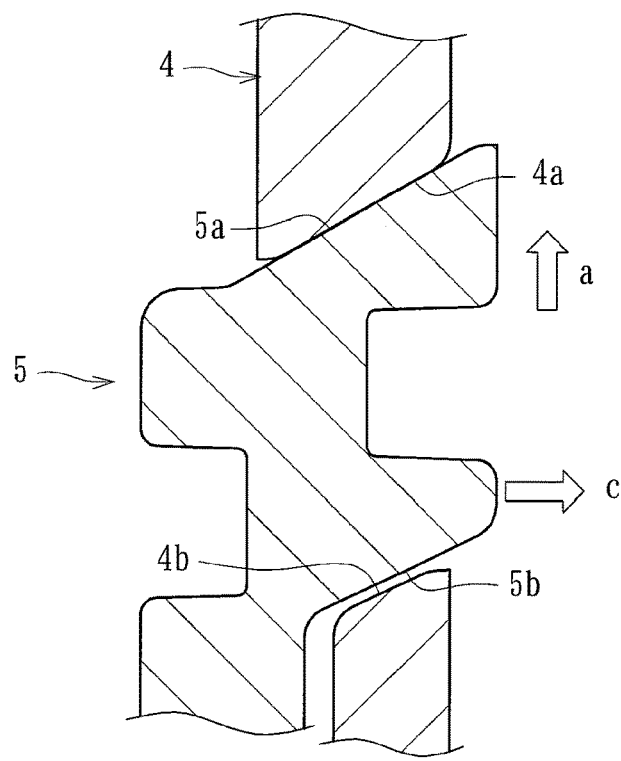
FIG. 7 illustrates a schematic view showing action of the press-contact assisting cam of the power transmitting apparatus of FIG. 1.
Figure 8:
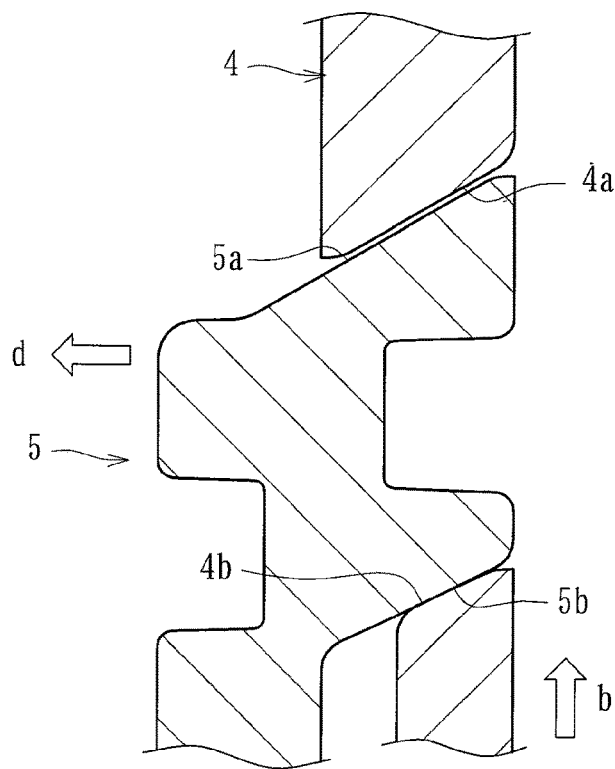
FIG. 8 illustrates a schematic view showing action of a back-torque limiting cam of the power transmitting apparatus of FIG. 1.

According to the present inventions, the clutch member 4 can be formed with inclined surfaces 4a, 4b and the pressure member 5 can be formed with inclined surfaces 5a, 5b opposed respectively to the inclined surfaces 4a, 4b as shown in FIGS. 6-8. That is, the inclined surfaces 4a and inclined surface 5a can perform a function of a press-contact assisting cam when they are abutted against each other and the inclined surfaces 4b and inclined surface 5b can perform a function of back-torque limiting cam when they are abutted against each other.

As shown in FIG. 7, in conditions where the rotational power "a" inputted to the gear 1 and clutch housing 2 can be transmitted to the shaft 3 via the pressure member 5 and clutch member 4 on start of an engine, a force "c" is imparted on the pressure member 5 by cam action of the press-contact assisting cam due to application of the rotational force "a" to the pressure member 5. Accordingly, the pressure member 5 is further moved toward the flange surface 4c of the clutch member 4 (e.g., toward the right in FIG. 1) and thus the press-contacting force between the driving-side clutch discs 6 and the driven-side clutch discs 7 is increased.

On the contrary, when the rotational speed of the shaft 3 exceeds that of the gear 1 and clutch housing 2 and a back-torque "b" is caused as shown in FIG. 8, a force "d" is caused on the pressure member 5 by cam action of the back-torque limiting cam. Accordingly, the pressure member 5 is moved toward the direction "d" separating the driving-side clutch discs 6 and the driven-side clutch discs 7 to release the press-contacting force. This can reduce problems with the power transmitting apparatus and with the engine caused by the back-torque.

The weight members 8 can be arranged in radially extending grooves 2a formed on the clutch housing 2 for press-contacting the driving-side clutch discs 6 and the driven-side clutch discs 7 with each other in response to movement of the weight members 8 from their radially inward positions to radially outward positions caused by a centrifugal force due to rotation of the clutch housing 2. That is, bottom surfaces of the grooves 2a (e.g., rolling surfaces of the weight members 8) are formed as uphill slopes and the weight members 8 are adapted to be held at radially innermost positions by urging force of the elastic members 13 when the clutch housing 2 is in the stopped condition and moved along the uphill slopes (see, e.g., FIG. 11) toward the radially outermost positions (see, e.g., FIG. 12) by a centrifugal force when the clutch housing 2 is rotated.

Figure 13:
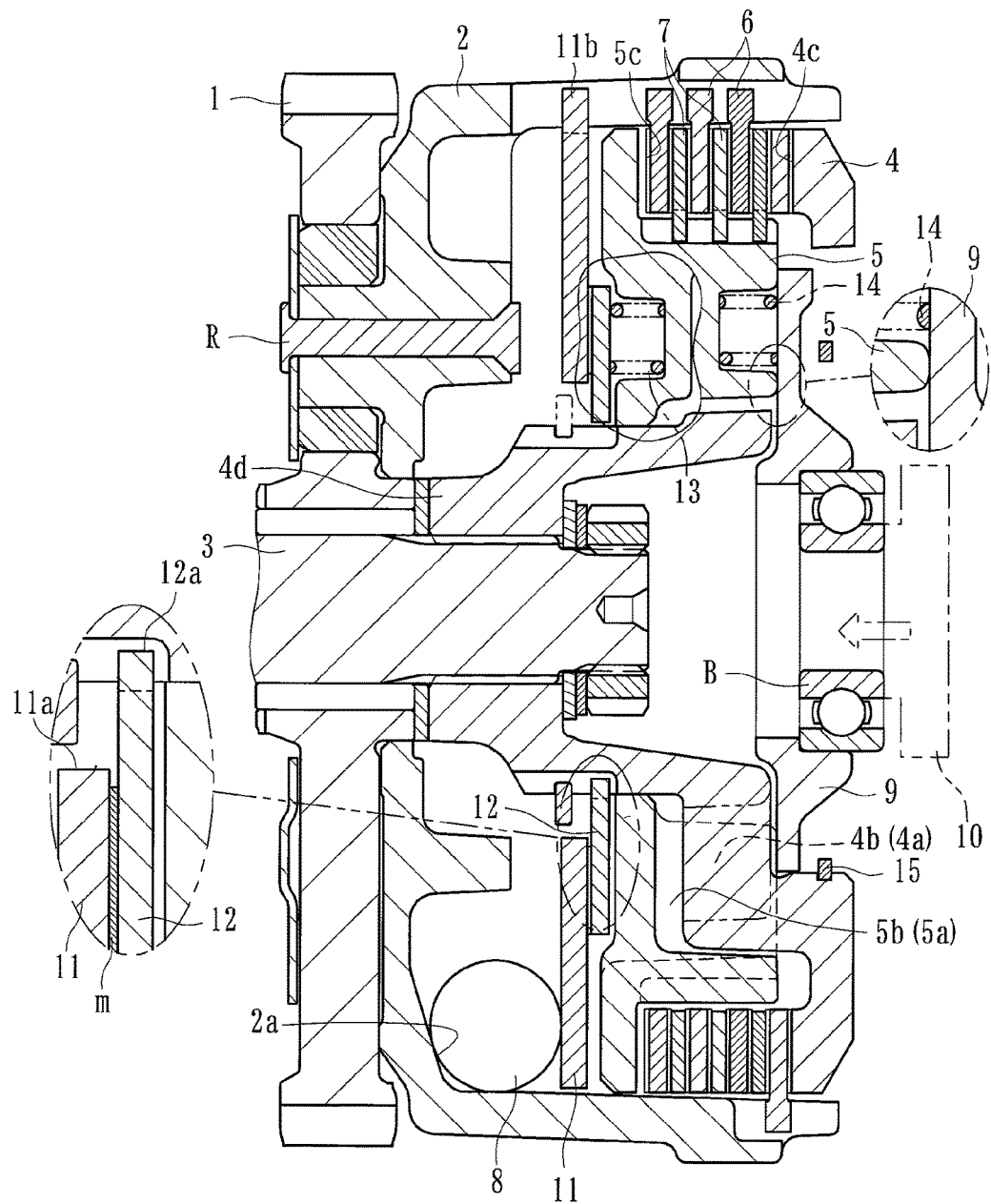
FIG. 13 illustrates a longitudinal sectional view of the power transmitting apparatus showing a state in which an actuating member has been operated.

The actuating member 9 has an external shape shown in FIG. 4 and is operated by a manually operable device 10 (e.g., manually operable means 10) to move the pressure member 5 toward the left (e.g., in the frame of reference of FIG. 1) to release the press-contacting force between the driving-side clutch discs 6 and the driven-side clutch discs 7. The operating device 10 is manually operated by a driver via a clutch pedal or clutch lever or other device of a vehicle to be moved toward the left (e.g., in the frame of reference of FIG. 1) to urge the actuating member 9 toward the left by abutting a bearing "B" (e.g., strictly an inner ring of the bearing) as shown in FIG. 13.

More particularly, the actuating member 9 can be arranged adjacent to the pressure member 5 via an urging device 14 (e.g., an urging means 14) and can be adapted to move the pressure member 5 to the left (e.g., in the frame of reference of FIG. 1) by being moved against the elastic force of the urging device 14 and abutted against the pressure member 5 when the actuating member 9 is pushed toward the left by the operating device 10. Although the urging device 14 is shown as a coil spring, it is possible to use any conventional urging device such as a Belleville spring which is able to normally urge the actuating member 9 toward the right (e.g., in the frame of reference of FIG. 1) opposite to the pushing direction.

In some embodiments, a stopper 15 is provided which limits further movement of the actuating member 9 to the right (e.g., in the frame of reference of FIG. 1) by abutting against the actuating member 9 urged by the urging device 14. Accordingly, the actuating member 9 is held at a position abutted against the stopper 15 during non-actuated times and moves the pressure member 5 to the left (e.g., in the frame of reference of FIG. 1) by abutting against the pressure member 5 after having been moved to the left against the urging force of the urging device 14 when the actuating member 9 is operated by the operating device 10. Thus, the urging device 14 and the stopper 15 constitute a holding device (e.g., holding means) of the present inventions for holding a separate distance between the actuating member 9 and the operating device 10 and for allowing the operation of the actuating member 9.

Figure 9:
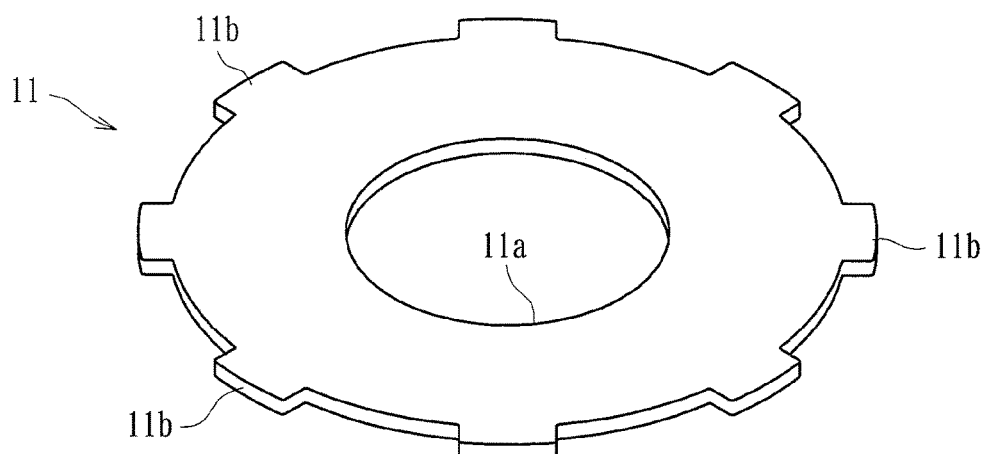
FIG. 9 illustrates a perspective view showing a first sheet member (e.g., one of interlocking members) of the power transmitting apparatus.

The first and second sheet members 11, 12 constituting interlocking members of the present inventions are adapted to be interlocked with the motion of the weight members 8 from their radially innermost positions to radially outermost positions and moved toward the pressure member 5. The first sheet member 11 comprises an annular member shown in FIG. 9 formed with a central aperture 11a and a plurality of projections 11b on its outer circumference. The projections 11b are adapted to be fitted in grooves formed on the inner circumference of the clutch housing 2 and are able to be rotated together with the clutch housing 2 and moved in both the right and left directions in FIG. 1.

Figure 10A:
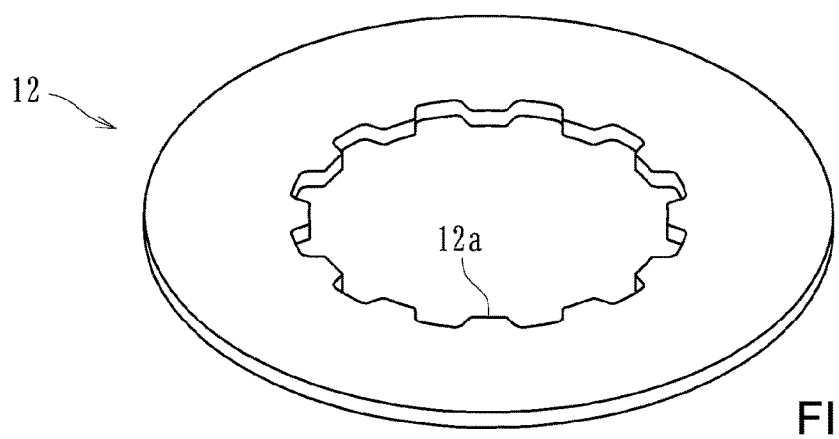
Figure 10B:
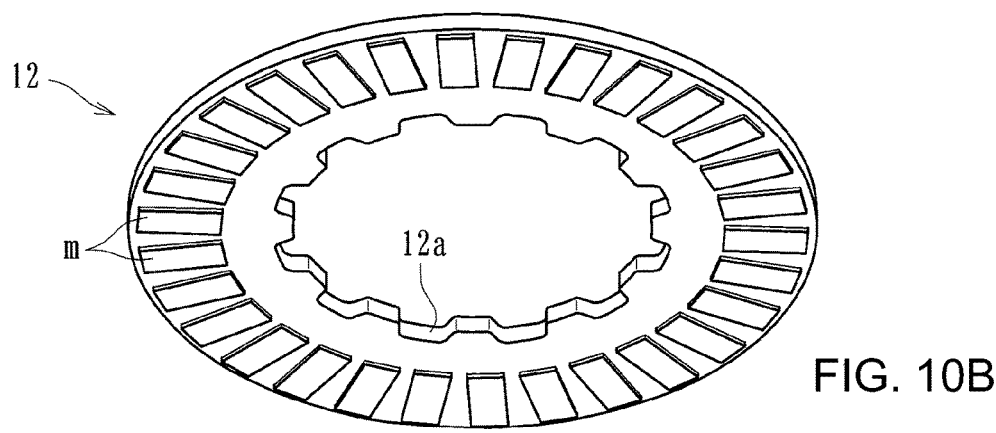

The second sheet member 12 also comprises an annular member shown in FIGS. 10A-10B formed with a central aperture 12a having irregularities along its inner circumferential edge. The second sheet member 12 is assembled to the clutch member 4 with the irregularities being fitted on a spline formed on the outer circumference of the clutch member 4. One surface of the second sheet member 12 supports one end of the elastic members 13 and the other surface (e.g., back surface) of the second sheet member 12 has annularly arranged friction members "m" adhered thereto. When the first and second sheet members 11, 12 are assembled to the power transmitting apparatus of the present inventions, the friction members "m" are arranged between the first and second sheet members 11, 12.

Accordingly, the first and second sheet members 11, 12 can integrally rotate and move in the right and left directions (e.g., in the frame of reference of FIG. 1) via the friction members "m" and also can independently rotate with respect to each other so that the first sheet member 11 slides on the friction members "m" when rotation of the second sheet member 12 is stopped. The weight members 8 are in contact with the back surface of the first sheet member 11. Accordingly, the first and second sheet members 11, 12 (and, accordingly, the pressure member 5) are interlocked with the radial movement of the weight members 8 due to the centrifugal force applied thereto and moved to the right and left directions (e.g., in the frame of reference of FIG. 1).

The elastic members 13 can comprise coil springs interposed between the interlocking members (e.g., the first sheet member 11 and second sheet member 12) and the pressure member 5. The elastic members 13 can be able to move the pressure member 5 toward a direction for press-contacting the driving-side clutch discs 6 and the driven-side clutch discs 7 by urging the pressure member 5 in response to the movement of the interlocking members. The elastic members 13 can also be able to absorb the urging force of the pressure member 5 applied to interlocking members when the actuating member 9 is operated.

Figure 11:
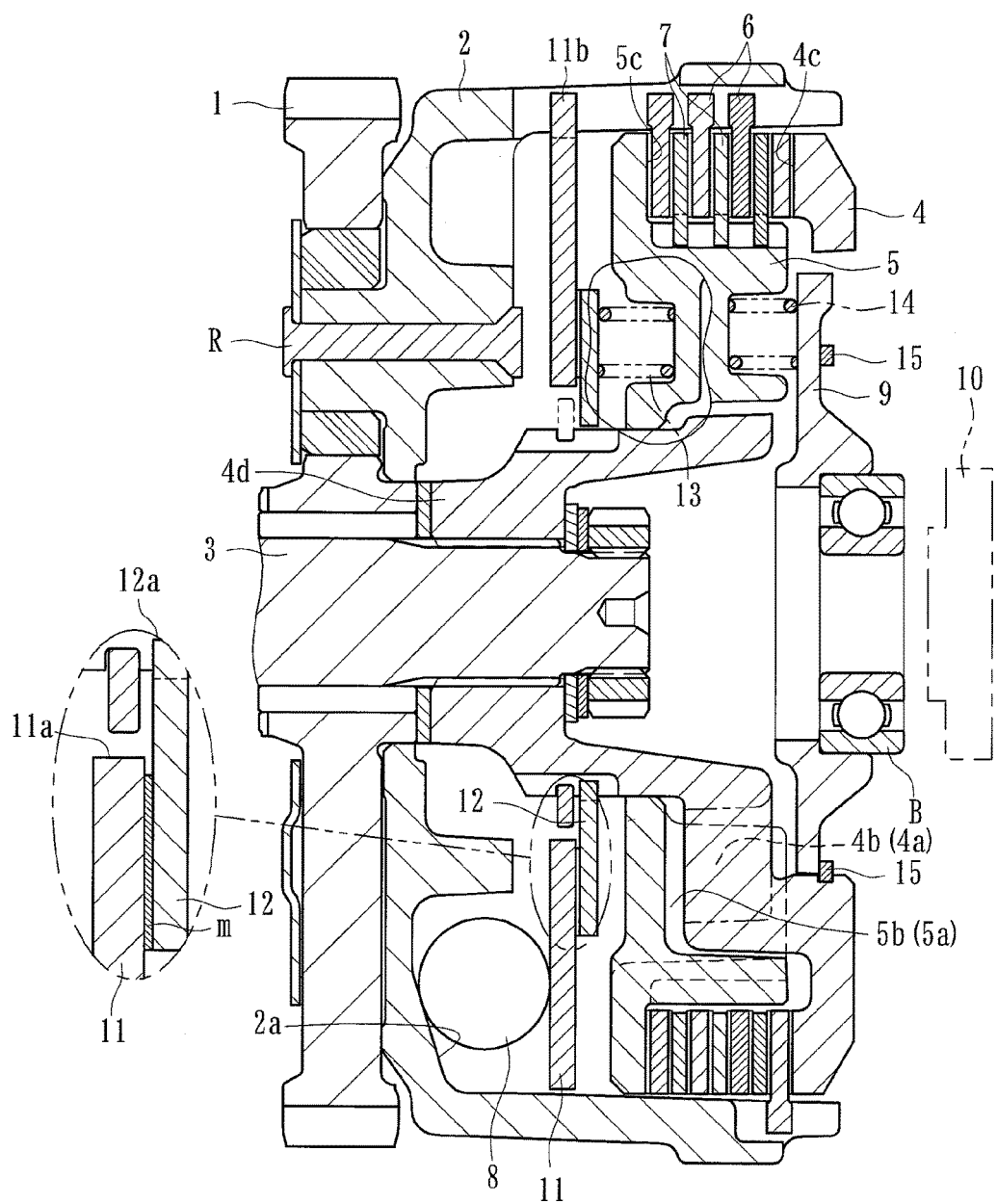
FIG. 11 illustrates a longitudinal sectional view of the power transmitting apparatus showing a course during one of weight members is moved.
Figure 12:
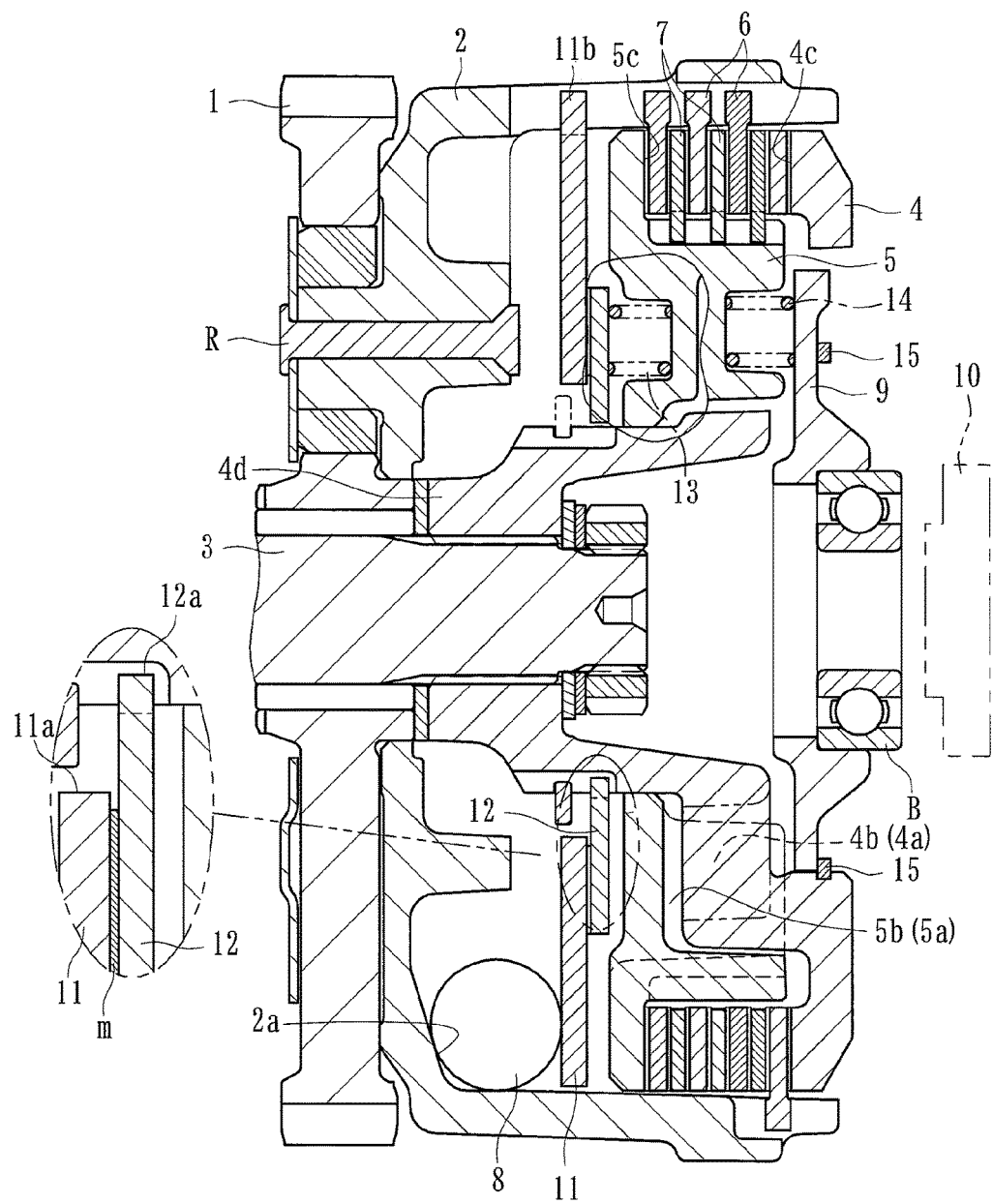
FIG. 12 illustrates a longitudinal sectional view of the power transmitting apparatus showing a state in which one of weight members has been moved.

That is, when the weight members 8 are moved from their radially innermost positions to radially outermost positions according to the rotation of the clutch housing 2 and thus the first and second sheet members 11, 12 (e.g., interlocking members) are pushed. The pushing force is transmitted to the pressure member 5 via the elastic members 13 and moves the pressure member 5 to the right (e.g., in the frame of reference of FIG. 1) and thus the driving-side clutch discs 6 and the driven-side clutch discs 7 are press-contacted as shown in FIGS. 11 and 12. In this situation, if the actuating member 9 is operated, the urging force applied to the first and second sheet members (e.g., the interlocking members) 11, 12 is absorbed by the elastic members 13 and accordingly the positions of the interlocking members (e.g., the positions of the weight members 8) can be held even though the pressure member 5 is moved toward the left by the pushing force due to the actuating member 9.

According to the present inventions, since the driving power can be transmitted by press-contacting the driving-side clutch discs 6 and the driven-side clutch discs 7 against each other due to radial movement of the weight members 8 by the centrifugal force, and since the power transmission in this condition can be cut off by releasing the press-contacting force between the driving-side clutch discs 6 and the driven-side clutch discs 7 while maintaining the radially outermost positions of the weight members 8 by manually operating the actuating member 9, it is possible to improve the operability of manually cutting-off operation of the power transmission.

Figure 14:
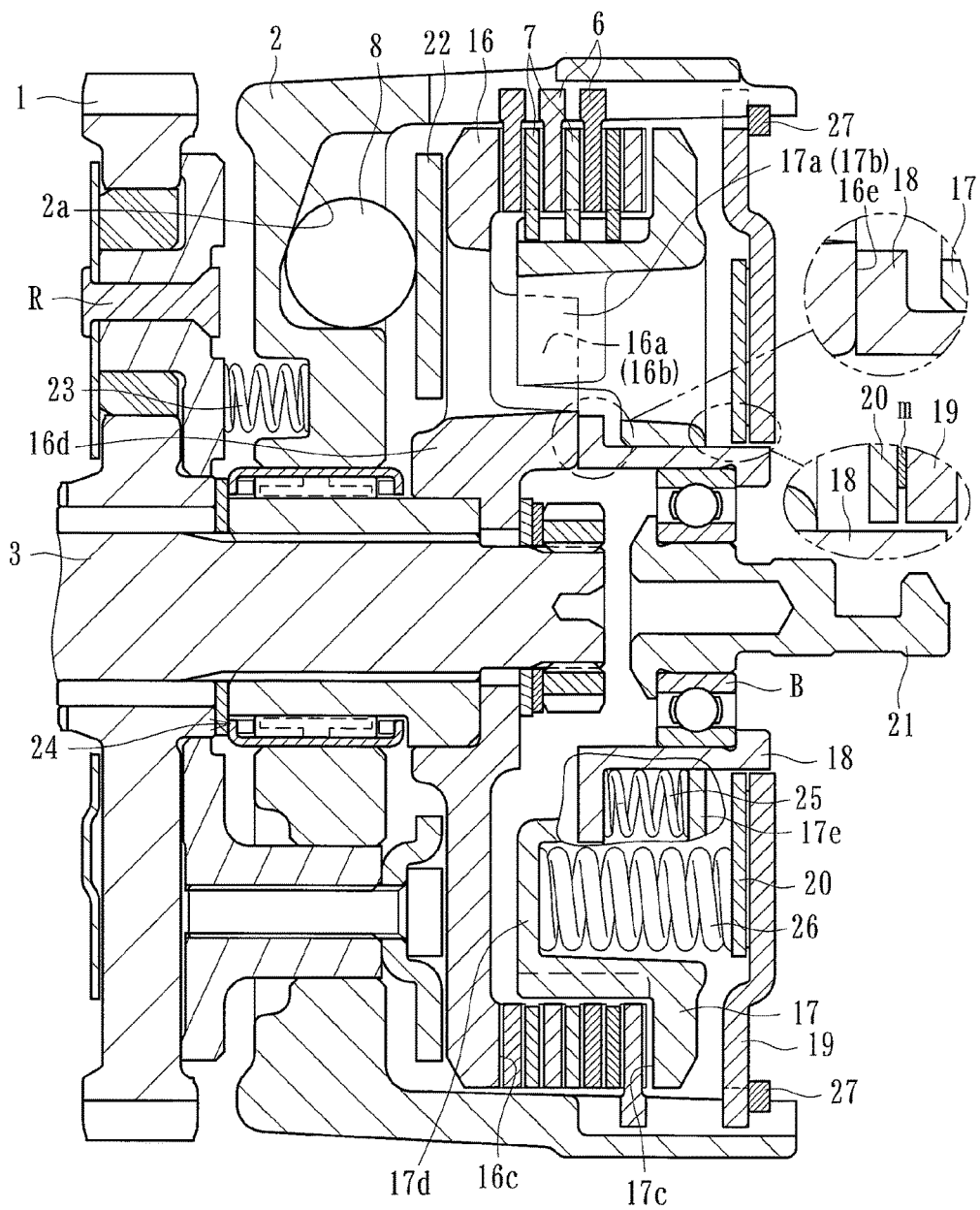
FIG. 14 illustrates a longitudinal section view of a power transmitting apparatus of a second embodiment of the present inventions.

According to some variants, a power transmitting apparatus of the present disclosure can be mounted on a vehicle such as a motorcycle to arbitrarily transmit or cut-off the driving power of an engine to or from a transmission or driving wheel. As shown in FIG. 14, the power transmitting apparatus mainly comprises a clutch housing 2 on which a gear 1 as an input member is mounted, a clutch member 16 connected to a shaft 3 as an output member, a pressure member 17 arranged at the right (e.g., in the frame of reference of FIG. 14) of the clutch member 16, a plurality of driving-side clutch discs 6 and a plurality of driven-side clutch discs 7, weight members 8 formed of hard balls rollable within the clutch housing 2, a manually operable actuating member 18, a first sheet member 19 and a second sheet member 20 acting as interlocking members, and/or elastic members 26. Structural elements of the embodiments of FIGS. 14-17 are the same as those of the embodiments if FIGS. 1-13 and are denoted by same reference numerals used in the embodiments of FIGS. 1-13 and their detailed descriptions will be omitted.

In some embodiments, the clutch housing 2 is formed with grooves 2*a* for guiding the weight members 8 moved by centrifugal force. In some embodiments, coil springs 23 are arranged between the clutch housing 2 and the gear 1 and accordingly the clutch housing 2 is movable toward the gear 1. In the drawings, a numeral 24 denotes a one-way clutch arranged between the clutch housing and shaft 3, and a numeral 22 denotes an annular sheet member arranged between the weight members 8 and the clutch member 16.

Figure 15:
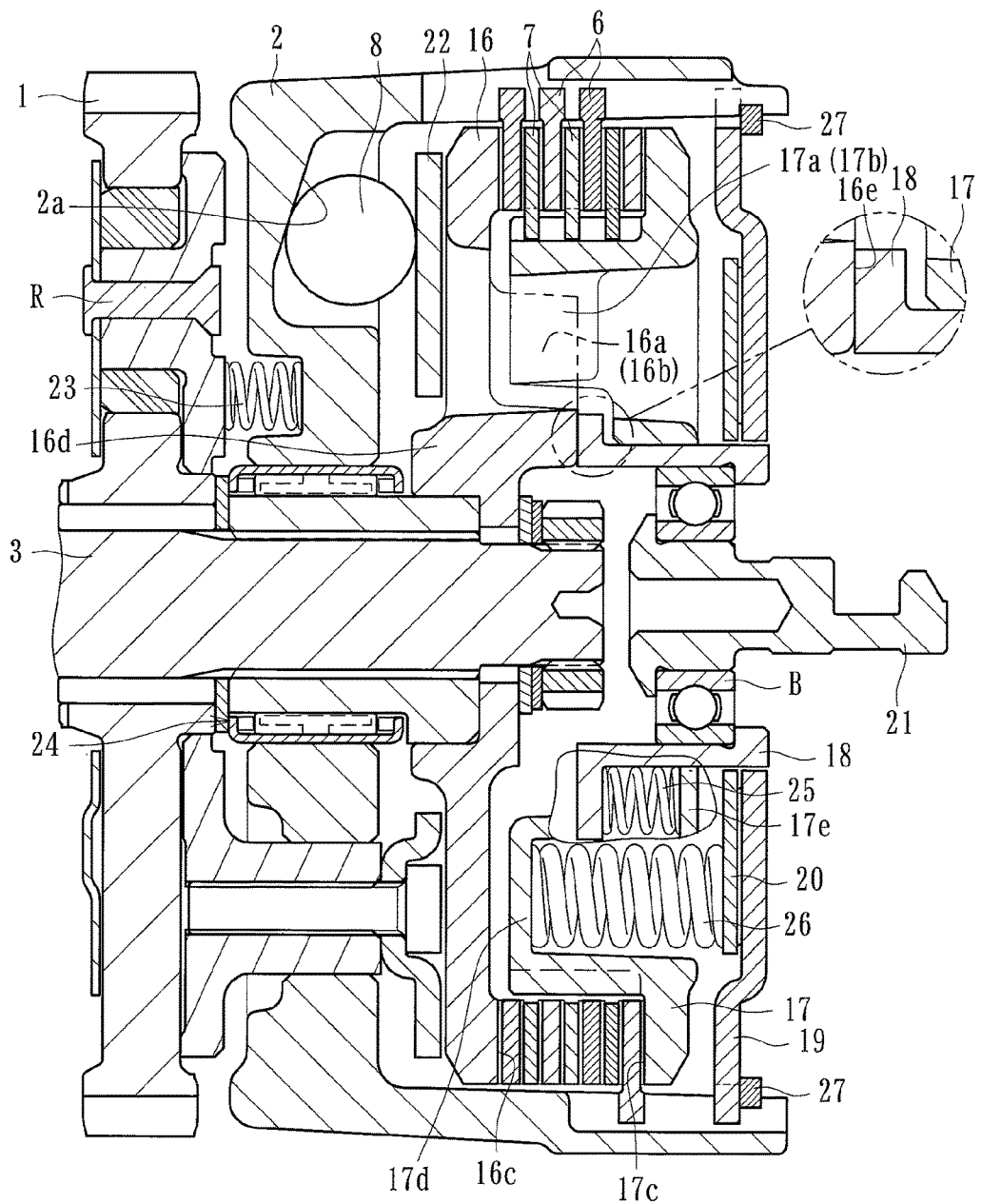
FIG. 15 illustrates a longitudinal sectional view of the power transmitting apparatus showing a course during one of weight members is moved.
Figure 16:
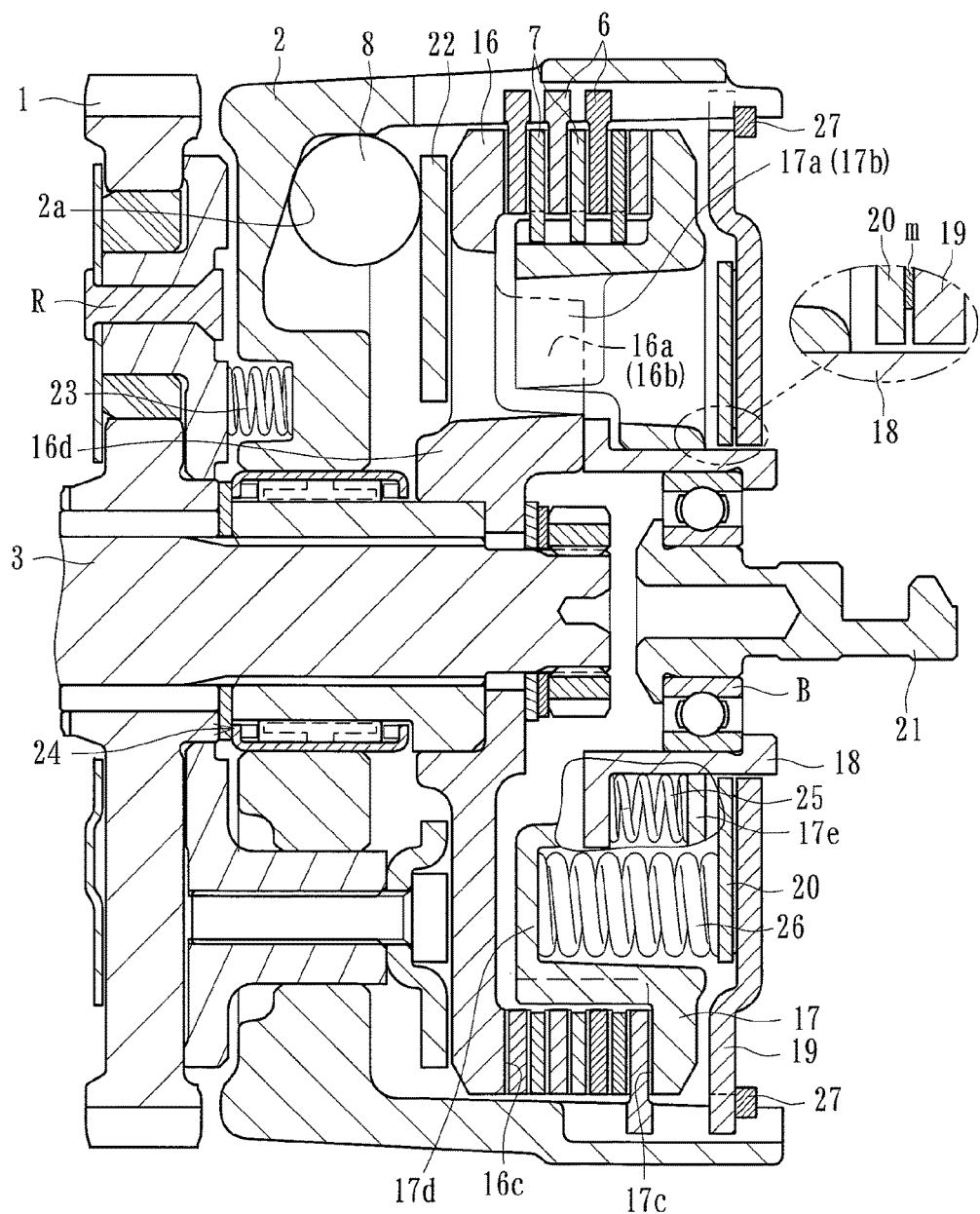
FIG. 16 illustrates a longitudinal sectional view of the power transmitting apparatus showing a state in which one of weight members has been moved.

The weight members 8 can be held at radially innermost positions by the urging force of the coil springs 23 when the clutch housing 2 is in a stopped condition and moved along uphill slopes by the centrifugal force when the clutch housing 2 is rotated (e.g., as illustrated in FIG. 15) and finally moved to a radially outermost positions (e.g., as illustrated in FIG. 16). When the weight members 8 are moved to the radially outermost positions, the annular sheet member 22 is urged toward the right and simultaneously the clutch housing 2 is moved toward the left by the reaction force applied to the weight balls 8 against the urging force of the coil springs 23.

The base 16*d* of the clutch member 16 can be secured to a tip end of the shaft 3 so that the shaft 3 as an output member is rotated when the clutch member 16 is rotated. The pressure member 17 can be mounted on the clutch member 16 and a plurality of driving-side clutch discs 16 and a plurality of driven-side clutch discs 7 can be arranged between a flange surface 17*c* of the pressure member 17 and a flange surface 16*c* of the clutch member 16.

The pressure member 17 can be axially movably mounted on the clutch member 16 so that the pressure member 17 can press-contact and release the driving-side clutch discs 6 and the driven-side clutch discs 7. In some embodiments, the outer circumference of the pressure member 17 can be formed with an axially extending spline on which the driven-side clutch discs 7 are fitted.

In some embodiments, the clutch member 16 is formed with inclined surfaces 16*a*, 16*b* and the pressure member 17 is formed with inclined surfaces 17*a*, 17*b* opposed respectively to the inclined surfaces 16*a*, 16*b*. That is, the inclined surfaces 16*a* and inclined surface 17*a* perform a function of press-contact assisting cam when they are abutted against each other and the inclined surfaces 16*b* and inclined surface 17*b* perform a function of back-torque limiting cam when they are abutted against each other. The action of the press-contact assisting cam and back-torque limiting cam is same as that of those discussed in reference to FIGS. 1-13.

Figure 17:
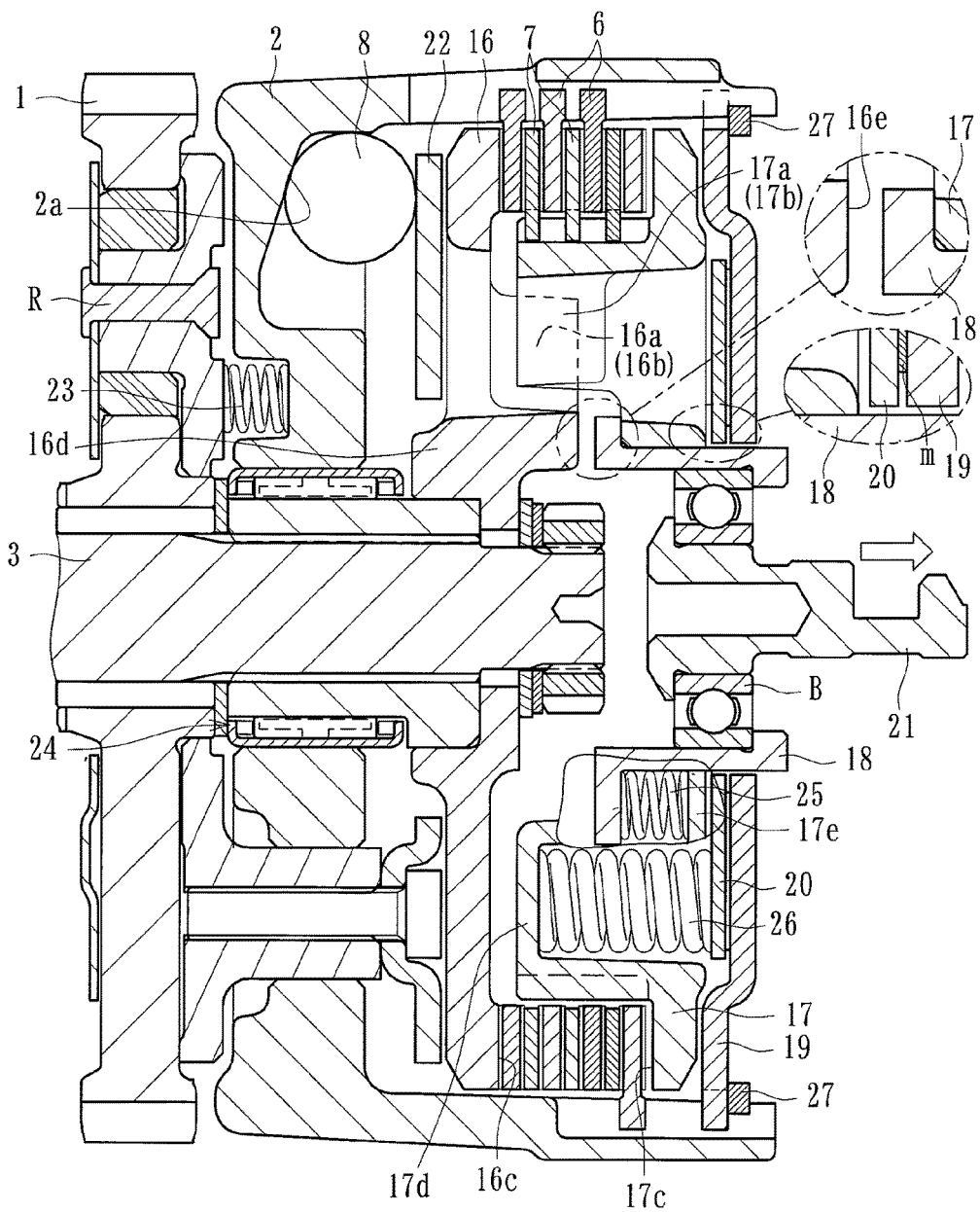
FIG. 17 illustrates a longitudinal sectional view of the power transmitting apparatus showing a state in which an actuating member has been operated.

The actuating member 18 can be operated by a manually operable device 21 (e.g., manually operable means 21) to move the pressure member 17 toward the right (e.g., in the frame of reference of FIG. 14) to release the press-contacting force between the driving-side clutch discs 6 and the driven-side clutch discs 7. Similarly to the operating device 10 described above, the operating device 21 can be manually operated by a driver via a clutch pedal or clutch lever (e.g., or other device) of a vehicle to be moved toward the left (e.g., in the frame of reference of FIG. 1) to pull the actuating member 18 toward the right while abutting a bearing "B" (e.g., strictly an inner ring of the bearing "B") as shown in FIG. 17.

More particularly, the actuating member 18 can be arranged adjacent to the pressure member 17 (e.g., strictly a portion 17*e* of the pressure member) via an urging device 25 (e.g., urging means 25) and can be adapted to move the pressure member 17 to the right (e.g., in the frame of reference of FIG. 14) by being moved against the urging force of the urging device 25 and abutted against the pressure member 17 when the actuating member 18 is pulled toward the right by the operating device 21. Although the urging device 25 is shown as a coil spring, it is possible to use any conventional urging device such as a Belleville spring which is able to normally urge the actuating member 18 toward the left opposite to the pulling direction.

In some embodiments, the clutch member 16 includes an abutting surface 16*e* which limits further movement of the actuating member 18 to the left (e.g., in the frame of reference of FIG. 14) by abutting against the actuating member 18 urged by the urging device 25. Accordingly, the actuating member 18 can be held at a position abutted against the abutting surface 16*e* during non-actuated time and can move the pressure member 17 to the right by abutting against the pressure member 17 after having been moved to the right against the urging force of the urging device 25 when the actuating member 18 is operated by the operating device 21. Thus, the urging device 25 and the abutting surface 16*e* constitute a holding device (e.g., a holding means) of the present inventions for holding a separated distance (e.g., an abutted condition in FIG. 14-17) between the actuating member 18 and the operating device 21 during non-actuated time and for allowing the operation of the actuating member 9 in operation.

The first and second sheet members 19, 20 constituting interlocking members of the present inventions can be adapted to be interlocked through motion of the weight members 8 from their radially innermost positions to radially outermost positions and can be moved toward the pressure member 17. In some embodiments, the first sheet member 19 comprises an annular member and is able to be rotated together with the clutch housing 2 and moved to both the right and left directions in FIG. 14.

The second sheet member 20 can share some features with the second sheet member 12 (e.g., the second sheet member 20 can have an annular shape). In some embodiments, one surface of the second sheet member 20 supports one end of the elastic members 26 and the other surface (e.g., the back surface) of the second sheet member 20 has annularly arranged friction members "m" adhered thereto (see, e.g., the friction members "m" of FIGS. 10A and 10B). When the first and second sheet members 19, 20 are assembled to the power transmitting apparatus of the present inventions, the friction members "m" can be arranged between the first and second sheet members 19, 20.

Accordingly, the first and second sheet members 19, 20 can integrally rotate and move to the right and left directions (e.g., in the frame of reference of FIG. 14) via the friction members "m" and also can independently rotate each other so that the first sheet member 19 slides on the friction members "m" when rotation of the second sheet member 20 is stopped. The first and second sheet members 19, 20 can be interlocked with the radial movement of the weight members 8 and moved toward the left (e.g., in the frame of reference of FIG. 14) when the weight members 8 are moved from their radially innermost positions to radially outermost positions and whole the clutch housing 2 is also moved toward the left.

The elastic members 26 can comprise coil springs interposed between the interlocking members (e.g., first sheet member 19 and second sheet member 12) and the pressure member 17 and can be able to move the pressure member 17 toward a direction for press-contacting the driving-side clutch discs 6 and the driven-side clutch discs 7 by urging the pressure member 17 according to the movement of the interlocking members. In some embodiments, the elastic members 26 are able to absorb the urging force of the pressure member 17 applied to interlocking members when the actuating member 18 is operated.

That is, when the weight members 8 are moved from their radially innermost positions to radially outermost positions according to the rotation of the clutch housing 2 and thus the first and second sheet members 19, 20 (e.g., interlocking members) are pushed together with the clutch housing 2 by the weight members 8, the pushing force is transmitted to the pressure member 17 via the elastic members 26 and moves the pressure member 17 to the left (e.g., in the frame of reference of FIG. 14) and thus the driving-side clutch discs 6 and the driven-side clutch discs 7 are press-contacted as shown in FIGS. 15 and 16. In this situation, if the actuating member 18 is operated, the urging force applied to the first and second sheet members (e.g., interlocking members) 11, 12 is absorbed by the elastic members 26 and accordingly the positions of the interlocking members (e.g., positions of the weight members 8) can be held even though the pressure member 17 is moved toward the right by the pulling force due to the actuating member 18.

According to some embodiments of the present inventions, since the driving power can be transmitted by press-contacting the driving-side clutch discs 6 and the driven-side clutch discs 7 against each other due to radial movement of the weight members 8 by the centrifugal force and since the power transmission can also be cut off in this condition by releasing the press-contacting force between the driving-side clutch discs 6 and the driven-side clutch discs 7 while keeping the radially outermost positions of the weight members 8 during manual operation of the actuating member 18, it is possible to improve the operability of manually cutting-off of the power transmission.

According to some embodiments of the present inventions as described above, where the power transmitting apparatus comprises interlocking members (e.g., first member 11, 19 and second member 12, 20) interlocking with the motion of the weight members 8 from their radially inward positions to radially outward positions and movable toward a direction approaching to the pressure member 5, 1, and elastic members 13, 26 interposed between the interlocking members 11, 19 and 12 20 and the pressure member 5, 17 and able to move the pressure member 5, 17 toward a direction for press-contacting the driving-side clutch discs 6 and the driven-side clutch discs 7 by urging the pressure member 5, 17 according to the movement of the interlocking members 11, 19 and 12, 20 and also able to absorb the urging force of the pressure member 5, 17 applied to interlocking members 11, 19 and 12, 20 when the actuating member 9, 18 is operated, it is possible to maintain the operability of the power transmitting apparatus during the manual cutting-off operation of power transmission, to simplify the structure of the power transmitting apparatus, and thus to reduce the malfunctions during operation of the power transmitting apparatus.

According to some embodiments of the present inventions, where a movable member moving during motion of the weight member 8 from the radially innermost position to the radially outermost position and a movable member moved by the manually operated actuating member 9, 18 are formed as a common and single member (e.g., the pressure member 5, 17), it is possible to simplify the structure of the power transmitting apparatus, and thus to suppress the malfunction operation of the power transmitting apparatus.

In some embodiments where the elastic members 13, 26 comprise springs interposed between the interlocking members 11, 19 and 12, 20 and the pressure member 5, 17, it is possible to surely and smoothly absorb the urging force of the pressure member applied to the interlocking members during operation of the actuating member. The elastic members 13, 26 are not limited to coil springs and may be any other conventional urging device such as a Belleville spring.

In some embodiments, where the interlocking members 11, 19 and 12, 20 comprise a first sheet member 11, 19 connected to the clutch housing 2 and a second sheet member 12, 20 holding the elastic members 13, 26, and a friction member "m" is interposed between abutting surfaces of the first sheet member 11, 19 and the second sheet member 12, 20, it is possible to smoothly perform a sliding motion between the first and second sheet members 11, 19 and 12, 20 during rotation of the first sheet member 11, 19 relative to the second sheet member 12, 20 and surely perform the integral rotation and movement of the first and second sheet members 11, 19 and 12, 20.

In some embodiments, where the power transmitting apparatus of the present inventions further comprises a holding device (e.g., urging device 14, 25 and stopper 15, abutting surface 16*e*) for keeping a separated distance between the actuating member 9, 18 and the operating device 10, 21 and for allowing the motion of the actuating member 9, 18, it is possible to prevent the starting point of actuation of the actuating member 9, 18 from being differentiated by positions of the pressure member 5, 17 and thus to improve the operability of the clutch operation.

In some embodiments, where the power transmitting apparatus of the present inventions further comprises press-contact assisting cams formed by inclined cam surfaces 4*a*, 16*a* formed on the clutch member 4, 16 and inclined cam surfaces 5a, 17a formed on the pressure member 5, 17 which are oppositely arranged from each other and adapted to increase the press-contacting force between the driving-side clutch discs 6 and the driven-side clutch discs 7 when the rotational driving power inputted to the input member 1 can be transmitted to the output member 3, it is possible to apply the press-contacting force to the driving-side clutch discs 6 and the driven-side clutch discs 7 in addition to the press-contacting force caused by movement of the weight members 8 due to the centrifugal force and thus to achieve more smooth and sure press-contact of the driving-side clutch discs 6 and the driven-side clutch discs 7.

Although preferable embodiments of the present inventions have been described herein, the present inventions is not limited to these illustrated and described embodiments. For example, the driven-side clutch discs 7 may be fitted on a spline formed on the clutch member 4, 16 or the press-contact assisting cam or the back-torque limiting cam may be omitted. In particular, it is possible to omit the back-torque limiting cam and use only the press-contact assisting cam.

In addition, although it is described herein that the elastic members 13, 26 are springs (e.g., coil springs) interposed between the interlocking members and the pressure members, any elastic members may be used as long as they are interposed between the interlocking members and the pressure members. In addition, the holding device may be omitted and the weight member may be formed by materials other than hard balls (e.g., any members movable due to centrifugal force from the radially innermost position to the radially outermost position).

Furthermore, although it has been described that the actuating member 9, 18 is that operated by a manually operable device 10, 21, the operating device is not limited to manually operable devices and may be those operated by any actuator such as an electric motor, a hydraulic actuator, or some other device. The power transmitting apparatus of the present inventions can be applied to those of multiple disc clutch type for automobiles, such as, for example, three wheeled or four wheeled buggies or general purpose machines.

The present inventions can be applied to any power transmitting apparatus comprising interlocking members (e.g., first member and second member) interlocking with the motion of the weight members from their radially inward positions to radially outward positions and movable toward a direction approaching to the pressure member; and elastic members interposed between the interlocking members and the pressure member and able to move the pressure member toward a direction for press-contacting the driving-side clutch discs and the driven-side clutch discs by urging the pressure member according to the movement of the interlocking members and also able to absorb the urging force of the pressure member applied to interlocking members when the actuating member is operated, even though it has other different appearance or additional functions compared with those shown in the embodiments of the present inventions.

What is claimed is:

1. A power transmitting apparatus for transmitting or cutting-off a rotational driving power inputted to an input member to or from an output member by press-contacting or releasing a press-contacting force between a plurality of driving-side clutch discs and a plurality of driven-side clutch discs, the power transmitting apparatus comprising:
   a clutch housing rotatable together with the input member;
   the plurality of the driving-side clutch discs mounted on the clutch housing;
   the plurality of the driven-side clutch discs arranged between the driving-side clutch discs of the clutch housing alternately therewith;
   a clutch member connected to the output member;
   a pressure member mounted on the clutch member and axially movably relative to the clutch member so that the driving-side clutch discs and the driven-side clutch discs are forced to be press-contacted with each other and the press-contacting force acting on them is released in accordance with axial approach and separation of the pressure member relative to the clutch member;
   weight members arranged in radially extending grooves formed on the clutch housing for press-contacting the driving-side clutch discs and the driven-side clutch discs according to movement of the weight members from radially inward positions to radially outward positions caused by a centrifugal force due to rotation of the clutch housing;
   an actuating member for moving the pressure member in a direction for releasing the press-contacting force between the driving-side clutch discs and driven-side clutch discs;
   a holding device for keeping a separated distance between the actuating member and an operating device and for allowing a motion of the actuating member;
   interlocking members interlocking with a motion of the weight members from radially inward positions to radially outward positions and movable toward the pressure member; and
   elastic members interposed between the interlocking members and the pressure member and able to move the pressure member toward a direction for press-contacting the driving-side clutch discs and the driven-side clutch discs by urging the pressure member according to the movement of the interlocking members, the elastic members being able to absorb an urging force of the pressure member applied to interlocking members when the actuating member is operated.

2. The power transmitting apparatus of claim 1, wherein the elastic members comprise springs interposed between the interlocking members and the pressure member.

3. The power transmitting apparatus of claim 2, wherein the interlocking members comprise a first sheet member connected to the clutch housing and a second sheet member holding the elastic members, and wherein a friction member is interposed between abutting surfaces of the first sheet member and the second sheet member.

4. The power transmitting apparatus of claim 2, further comprising press-contact assisting cams formed by inclined cam surfaces formed on the clutch member and inclined cam surfaces formed on the pressure member which are oppositely arranged from each other and adapted to increase the press-contacting force between the driving-side clutch discs and the driven-side clutch discs when the rotational driving power inputted to the input member can be transmitted to the output member.

5. The power transmitting apparatus of claim 2, wherein the actuating member can be operated by the operating device and the operating device is manually driven or driven by power.

6. The power transmitting apparatus of claim 1, wherein the interlocking members comprise a first sheet member connected to the clutch housing and a second sheet member holding the elastic members, and wherein a friction member is interposed between abutting surfaces of the first sheet member and the second sheet member.

7. The power transmitting apparatus of claim 6, further comprising press-contact assisting cams formed by inclined cam surfaces formed on the clutch member and inclined cam surfaces formed on the pressure member which are oppositely arranged from each other and adapted to increase the press-contacting force between the driving-side clutch discs and the driven-side clutch discs when the rotational driving power inputted to the input member can be transmitted to the output member.

8. The power transmitting apparatus of claim 6, wherein the actuating member can be operated by the operating device and the operating device is manually driven or driven by power.

9. The power transmitting apparatus of claim 1, wherein the holding device comprises a stopper which abuts a top side of the actuating member and limits its motion and a spring which abuts a bottom side of the actuating member and maintains the separated distance between the actuating member and the operating device while allowing for the motion of the actuating member, wherein the actuating member comprises an annular member having a central bore and at least one radially extending protrusion configured to abut the stopper on a top side of the radially extending protrusion and abut the spring on a bottom side of the radially extending protrusion, and wherein the central bore is configured to be engaged by the operating device.

10. The power transmitting apparatus of claim 9, further comprising press-contact assisting cams formed by inclined cam surfaces formed on the clutch member and inclined cam surfaces formed on the pressure member which are oppositely arranged from each other and adapted to increase the press-contacting force between the driving-side clutch discs and the driven-side clutch discs when the rotational driving power inputted to the input member can be transmitted to the output member.

11. The power transmitting apparatus of claim 10, wherein the actuating member can be operated by the operating device and the operating device is manually driven or driven by power.

12. The power transmitting apparatus of claim 1, further comprising press-contact assisting cams formed by inclined cam surfaces formed on the clutch member and inclined cam surfaces formed on the pressure member which are oppositely arranged from each other and adapted to increase the press-contacting force between the driving-side clutch discs and the driven-side clutch discs when the rotational driving power inputted to the input member can be transmitted to the output member.

13. The power transmitting apparatus of claim 1, wherein the actuating member can be operated by the operating device and the operating device is manually driven or driven by power.

14. The power transmitting apparatus of claim 1, wherein the actuating member can be operated by a clutch pedal that is manually driven or driven by power.

15. A power transmitting apparatus for transmitting or cutting-off a rotational driving power from or to an input member to or from an output member by press-contacting or releasing driving-side clutch discs and driven-side clutch discs to or from each other, the power transmitting apparatus comprising:
a clutch housing rotatable together with the input member, wherein the plurality of driving-side clutch discs are mounted on the clutch housing and the plurality of driven-side clutch discs are interleaved with the driving-side clutch discs;
a clutch member connected to the output member;
a pressure member mounted on the clutch member and axially movably relative to the clutch member to press-contact the driving-side clutch discs and the driven-side clutch discs to each other and to release a press-contacting force acting on the driving-side clutch discs and on the driven-side clutch discs in accordance with movement of the pressure member relative to the clutch member;
weight members arranged in radially extending grooves formed on the clutch housing, the weight members configured to press-contact the driving-side clutch discs and the driven-side clutch discs according to movement of the weight members from radially inward positions to radially outward positions in response to a centrifugal force due to rotation of the clutch housing;
an actuating member configured to move the pressure member in a direction to release the press-contacting force between the driving-side clutch discs and driven-side clutch discs, wherein the actuating member comprises an annular member having a central bore and at least one radially extending protrusion configured to abut a stopper on a top side of the radially extending protrusion and abut a spring on a bottom side of the radially extending protrusion, and wherein the central bore is configured to be engaged by an operating device;
interlocking members interlocking with a motion of the weight members from radially inward positions to radially outward positions and movable toward the pressure member; and
elastic members interposed between the interlocking members and the pressure member, the elastic member configured to move the pressure member toward a direction so as to press-contact the driving-side clutch discs and the driven-side clutch discs by urging the pressure member according to the movement of the interlocking members, the elastic members configured to absorb an urging force of the pressure member applied to interlocking members when the actuating member is operated.

* * * * *